United States Patent
Kulkarni et al.

(10) Patent No.: US 12,020,403 B2
(45) Date of Patent: Jun. 25, 2024

(54) SEMANTICALLY-AWARE IMAGE EXTRAPOLATION

(71) Applicant: Adobe Inc., San Jose, CA (US)

(72) Inventors: Kuldeep Kulkarni, Karnataka (IN); Soumya Dash, Orissa (IN); Hrituraj Singh, Uttar Pradesh (IN); Bholeshwar Khurana, Rajasthan (IN); Aniruddha Mahapatra, West Bengal (IN); Abhishek Bhatia, Punjab (IN)

(73) Assignee: Adobe Inc., San Jose, CA (US)

( * ) Notice: Subject to any disclaimer, the term of this patent is extended or adjusted under 35 U.S.C. 154(b) by 402 days.

(21) Appl. No.: 17/521,503

(22) Filed: Nov. 8, 2021

(65) Prior Publication Data
US 2023/0169632 A1    Jun. 1, 2023

(51) Int. Cl.
*G06T 5/50*    (2006.01)
*G06T 7/181*    (2017.01)
*G06V 20/70*    (2022.01)
*G06N 3/045*    (2023.01)
*G06T 7/11*    (2017.01)
*G06V 10/26*    (2022.01)
*G06V 10/82*    (2022.01)

(52) U.S. Cl.
CPC ............... *G06T 5/50* (2013.01); *G06T 7/181* (2017.01); *G06V 20/70* (2022.01); *G06N 3/045* (2023.01); *G06T 7/11* (2017.01); *G06V 10/26* (2022.01); *G06V 10/82* (2022.01)

(58) Field of Classification Search
CPC ... G06T 5/50; G06T 7/11; G06T 7/181; G06T 11/00; G06N 3/045; G06V 10/26; G06V 10/82; G06V 20/70
See application file for complete search history.

(56) References Cited

U.S. PATENT DOCUMENTS

2023/0051832 A1*  2/2023  Shin ..................... G06T 5/77

OTHER PUBLICATIONS

Arjovsky et al., Wasserstein GAN, Available online at https://arxiv.org/pdf/1701.07875.pdf, Dec. 6, 2017, 32 pages.
(Continued)

*Primary Examiner* — Daniel G Mariam
(74) *Attorney, Agent, or Firm* — Kilpatrick Townsend & Stockton LLP

(57) ABSTRACT

Certain aspects and features of this disclosure relate to semantically-aware image extrapolation. In one example, an input image is segmented to produce an input segmentation map of object instances in the input image. An object generation network is used to generate an extrapolated semantic label map for an extrapolated image. The extrapolated semantic label map includes instances in the original image and instances that will appear in an outpainted region of the extrapolated image. A panoptic label map is derived from coordinates of output instances in the extrapolated image and used to identify partial instances and boundaries. Instance-aware context normalization is used to apply one or more characteristics from the input image to the outpainted
(Continued)

region to maintain semantic continuity. The extrapolated image includes the original image and the outpainted region and can be rendered or stored for future use.

20 Claims, 7 Drawing Sheets

(56) References Cited

OTHER PUBLICATIONS

Azadi et al., Semantic Bottleneck Scene Generation, Available online at https://arxiv.org/pdf/1911.11357.pdf, Nov. 26, 2019, 15 pages.
Ballester et al., Filling-In by Joint Interpolation of Vector Fields and Gray Levels, IEEE Transactions on Image Processing, vol. 10, No. 8, Aug. 8, 2001, pp. 1200-1211.
Barnes et al., PatchMatch: A Randomized Correspondence Algorithm for Structural Image Editing, ACM Transactions on Graphi, vol. 28, Issue 3, Aug. 2009, 10 pages.
Bertalmio et al., Image Inpainting, Proceedings of the 27th Annual Conference on Computer Graphics and Interactive Techniques, 2020, 12 pages.
Bowen et al., OCONet: Image Extrapolation by Object Completion, Proceedings of the IEEE/CVF Conference on Computer Vision and Pattern Recognition, Jun. 2021, 11 pages.
Cheng et al., Panoptic-DeepLab: A Simple, Strong, and Fast Baseline for Bottom-Up Panoptic Segmentation, In Proceedings of the IEEE/CVF Conference on Computer Vision and Pattern Recognition, Mar. 11, 2020, pp. 1-16.
Cordts et al., The Cityscapes Dataset for Semantic Urban Scene Understanding, Proceedings of the Institute of Electrical and Electronics Engineers Computer Society Conference on Computer Vision and Pattern Recognition, 2016, pp. 1-11.
Dosovitskiy et al., Generating Images with Perceptual Similarity Metrics Based on Deep Networks, In Advances in Neural Information Processing Systems, Feb. 9, 2016, 14 pages.
Durugkar et al., Generative Multi-Adversarial Networks, Available online at https://openreview.net/pdf?id=Byk-VI9eg, 2016, pp. 1-14.
Efros et al., Image Quilting for Texture Synthesis and Transfer, In Proceedings of the 28th Annual Conference on Computer Graphics and Interactive Techniques, Association for Computing Machinery, Aug. 12-17, 2001, 6 pages.
Efros et al., Texture Synthesis by Non-Parametric Sampling, In Proceedings of the Seventh IEEE International Conference on Computer Vision, vol. 2, Sep. 1999, 6 pages.
Goodfellow et al., Generative Adversarial Nets, Advances in Neural Information Processing Systems, 2014, pp. 2672-2680.
Guo et al., Spiral Generative Network for Image Extrapolation, In European Conference on Computer Vision, 2020, pp. 1-17.
Heusel et al., GANs Trained by a Two Time-Scale Update Rule Converge to a Local Nash Equilibrium, In NIPS, Available Online at: https://dl.acm.org/doi/pdf/10.5555/3295222.3295408, Dec. 2017, pp. 1-12.
Hong et al., Learning Hierarchical Semantic Image Manipulation through Structured Representations, Proceedings of the 32nd International Conference on Neural Information Processing Systems, Dec. 2018, 11 pages.
Iizuka et al., Globally and Locally Consistent Image Completion, ACM Transactions on Graphics, vol. 36, No. 4, Article 107, Jul. 2017, pp. 1-14.
Isola et al., Image-to-Image Translation with Conditional Adversarial Networks, IEEE Conference on Computer Vision and Pattern Recognition, 2017, pp. 1125-1134.
Johnson et al., Perceptual Losses for Real-Time Style Transfer and Super-Resolution, In European Conference on Computer Vision, 2016, pp. 694-711.
Karras et al., Analyzing and Improving the Image Quality of StyleGAN, Conference: 2020 Institute of Electrical and Electronics Engineers/CVF Conference on Computer Vision and Pattern Recognition (CVPR), Mar. 23, 2020, pp. 1-21.
Kingma et al., Adam: A Method for Stochastic Optimization, International Conference on Learning Representations, Available Online at: https://arxiv.org/pdf/1412.6980v1.pdf, Dec. 22, 2014, 9 pages.
Kingma et al., Auto-encoding Variational Bayes, Machine Learning (stat.ML); Machine Learning (cs.LG), May 1, 2014, 14 pages.
Kirillov et al., Panoptic Segmentation, In Proceedings of the Institute of Electrical and Electronics Engineers Conference on Computer Vision and Pattern Recognition, Apr. 10, 2019, pp. 1-10.
Kopf et al., Quality Prediction for Image Completion, ACM Transactions on Graphics, vol. 31, No. 6, Nov. 2012, pp. 1-8.
Kulkarni et al., Halluci-Net: Scene Completion by Exploiting Object Co-occurrence Relationships, Available online at https://arxiv.org/pdf/2004.08614.pdf, May 21, 2021, pp. 1-10.
Lee et al., Context-Aware Synthesis and Placement of Object Instances, Proceedings of the 32nd International Conference on Neural Information Processing Systems, Dec. 2018, pp. 1-11.
Li et al., Controllable and Progressive Image Extrapolation, IEEE Winter Conference on Applications of Computer Vision, vol. 1, Dec. 25, 2019, pp. 1-10.
Li et al., GRAINS: Generative Recursive Autoencoders for Indoor Scenes, ACM Transactions on Graphics (TOG), vol. 38, No. 2, Feb. 2019, pp. 1-16.
Lim et al., Geometric GAN, Available online at https://arxiv.org/pdf/1705.02894.pdf, May 9, 2017, pp. 1-17.
Lin et al., Focal Loss for Dense Object Detection, Proceedings of the IEEE international conference on computer vision, Aug. 7, 2017, pp. 1-10.
Liu et al., Image Inpainting for Irregular Holes Using Partial Convolutions, Available Online at: https://openaccess.thecvf.com/content_ECCV_2018/papers/Guilin_Liu_Image_Inpainting_for_ECCV_2018_paper.pdf, Apr. 20, 2018, 1-23 pages.
Liu et al., Learning to Predict Layout-to-image Conditional Convolutions for Semantic Image Synthesis, Proceedings of the 33rd International Conference on Neural Information Processing Systems, Dec. 2019, pp. 1-11.
Mao et al., Least Squares Generative Adversarial Networks, In Proceedings of The IEEE International Conference on Computer Vision, Available online at https://arxiv.org/pdf/1611.04076.pdf, 2017, pp. 2794-2802.
Mescheder et al., Which Training Methods for GANs do actually Converge?, Available online at https://arxiv.org/pdf/1801.04406.pdf, Jul. 31, 2018, 39 pages.
Miyato et al., Spectral Normalization for Generative Adversarial Networks, International Conference on Learning Representations, Available online at https://arxiv.org/pdf/1802.05957.pdf, Feb. 16, 2018, pp. 1-26.
Ntavelis et al., Sesame: Semantic Editing of Scenes by Adding, Manipulating or Erasing Objects, In European Conference on Computer Vision, 2020, 18 pages.
Park et al., Semantic Image Synthesis with Spatially-Adaptive Normalization, Proceedings of the IEEE Conference on Computer Vision and Pattern Recognition, 2019, pp. 2337-2346.
Park et al., Swapping Autoencoder for Deep Image Manipulation, Advances in Neural Information Processing Systems, vol. 33, Dec. 14, 2020, pp. 1-23.
Pathak et al., Context Encoders: Feature Learning by Inpainting, In Proceedings of the IEEE Conference on Computer Vision and Pattern Recognition, 2016, 12 pages.
Qi et al., Semi-Parametric Image Synthesis, Proceedings of the IEEE Conference on Computer Vision and Pattern Recognition, Apr. 2018, pp. 8808-8816.
Shan et al., Photo Uncrop, European Conference on Computer Vision, 2014, pp. 16-31.
Simakov et al., Summarizing Visual Data Using Bidirectional Similarity, IEEE Conference on Computer Vision and Pattern Recognition, Jun. 23-28, 2008, 8 pages.
Simonyan et al., Very Deep Convolutional Networks for Large-Scale Image Recognition, Available Online at https://arxiv.org/pdf/1409.1556.pdf, Apr. 10, 2015, pp. 1-14.

(56) References Cited

OTHER PUBLICATIONS

Sivic et al., Creating and Exploring a Large Photorealistic Virtual Space, IEEE Computer Society Conference on Computer Vision and Pattern Recognition Workshops, 2008, pp. 1-8.

Song et al., SPG-Net: Segmentation Prediction and Guidance Network for Image Inpainting, Segmentation-Guided Image Inpainting, Available online at https://arxiv.org/pdf/1805.03356.pdf, Aug. 6, 2018, 14 pages.

Tao et al., Hierarchical Multi-Scale Attention for Semantic Segmentation, Available online at https://arxiv.org/pdf/2005.10821.pdf, May 21, 2020, pp. 1-11.

Teterwak et al., Boundless: Generative Adversarial Networks for Image Extension, In Proceedings of the IEEE International Conference on Computer Vision, 2019, pp. 10521-10530.

Van Den Oord et al., Pixel Recurrent Neural Networks, Proceedings of the 33rd International Conference on Machine Learning, vol. 48, Aug. 19, 2016, 10 pages.

Wang et al., Biggerpicture: Data-driven Image Extrapolation Using Graph Matching, ACM Transactions on Graphics, vol. 33, Issue 6, Nov. 2014, pp. 1-13.

Wang et al., High-resolution Image Synthesis and Semantic Manipulation with Conditional GANs, Proceedings of the IEEE Conference on Computer Vision and Pattern Recognition, Jun. 18-23, 2018, pp. 8798-8807.

Wang et al., Sketch-Guided Scenery Image Outpainting, IEEE Transactions on Image Processing, Jan. 26, 2021, pp. 1-13.

Wang et al., Wide-Context Semantic Image Extrapolation, In Proceedings of the IEEE Conference on Computer Vision and Pattern Recognition, Jun. 1, 2019, pp. 1-10.

Xian et al., TextureGAN: Controlling Deep Image Synthesis with Texture Patches, In Proceedings of the IEEE Conference on Computer Vision and Pattern Recognition, 2018, pp. 8456-8465.

Yang et al., High-Resolution Image Inpainting Using Multi-Scale Neural Patch Synthesis, In Proceedings of the IEEE Conference on Computer Vision and Pattern Recognition, Apr. 13, 2017, 9 pages.

Yang et al., Very Long Natural Scenery Image Prediction by Outpainting, In Proceedings of the IEEE International Conference on Computer Vision, 2019, pp. 10561-10570.

Yeh et al., Semantic Image Inpainting with Deep Generative Models, In Proceedings of the IEEE Conference on Computer Vision and Pattern Recognition (CVPR), Jul. 13, 2017, pp. 1-19.

Yu et al., Context Prior for Scene Segmentation, In Proceedings of the IEEE/CVF Conference on Computer Vision and Pattern Recognition, Available online at https://openaccess.thecvf.com/content_CVPR_2020/papers/Yu_Context_Prior_for_Scene_Segmentation_CVPR_2020_paper.pdf, 2020, pp. 12416-12425.

Yu et al., Generative Image Inpainting with Contextual Attention, In Proceedings of The IEEE Conference on Computer Vision and Pattern Recognition, Mar. 21, 2018, pp. 1-15.

Zhang et al., ResNeSt: Split-Attention Networks, IEEE Signal Processing Letters, vol. 27, Dec. 30, 2020, pp. 1-12.

Zhang et al., Self-Attention Generative Adversarial Networks, In International Conference on Machine Learning, Jun. 14, 2019, 10 pages.

Zhang et al., SiENet: Siamese Expansion Network for Image Extrapolation, IEEE Signal Processing Letters, vol. 27, 2020, ArXiv:2007.03851v1, Jul. 2020, pp. 1-5.

Zhao et al., Pyramid Scene Parsing Network, Institute of Electrical and Electronics Engineers Conference on Computer Vision and Pattern Recognition, Apr. 27, 2017, 11 pages.

Zhou et al., Scene Parsing through ADE20K Dataset, In Proceedings of the IEEE Conference on Computer Vision and Pattern Recognition, Jul. 2017, 10 pages.

* cited by examiner

SEMANTICALLY-AWARE IMAGE EXTRAPOLATION

TECHNICAL FIELD

The present disclosure generally relates to digital image editing. More specifically, but not by way of limitation, the present disclosure relates to programmatic techniques for efficiently rendering an extrapolated, digital image from an input digital image, wherein the rendered image includes objects, background, and/or other salient features outside the boundaries of the input digital image.

BACKGROUND

Image editing or image processing software applications are used for a number of different functions connected to manipulating or editing digital images produced by digital cameras and mobile devices. Image extrapolation is one such function. Image extrapolation, sometimes also referred to as "outpainting," refers to the process of digitally or virtually extending an input image beyond its existing boundaries. For example, an image of objects or people that is captured using a digital camera at social distances with a normal lens can be outpainted using image editing software to add pixels outside the frame in order to render an apparently wider view so that more of a background or side landscape is visible. Image extrapolation is useful for designing virtual reality and gaming imagery, producing videos and movies, creating illustrations for publications, and many other endeavors.

The visual quality, diversity, and saliency of material added to a digital image to produce an extrapolated image varies depending on the algorithm being used to generate the added material, the computing power and processing time available, the nature and quantity of information used to generate the added pixels, image semantics, and how much manual labor is involved. Generally however, existing methods of programmatic image extrapolation are limited to substantially replicating textures and objects already present in the original image. Thus, these automated methods are primarily directed to subjects such as landscapes, where acceptable results can be provided by just extending textures or reproducing repetitive objects. The adding of more diverse objects or more interesting background features must typically be accomplished manually with attention paid to the semantics, or the nature and identification of the various features, of the original image. Thus, existing image-extrapolation techniques are either labor-intensive or produce extrapolated images that lack saliency and realism.

SUMMARY

Certain aspects and features of the present disclosure relate to semantically-aware image extrapolation. For example, a computer-implemented method involves segmenting, using a segmentation network, an input image to produce an input segmentation map of input instances in the input image. The computer-implemented method further involves generating, using the input segmentation map and a peripheral object generation network, an extrapolated semantic label map for an extrapolated image corresponding to the input image, and generating, using a generator network, a panoptic label map for the extrapolated image using the extrapolated semantic label map. The panoptic label map is derived from center coordinates and offsets for the output instances in the extrapolated image. The computer-implemented method further involves normalizing, using an instance-aware context normalizer, the input image to apply one or more mean characteristics from the input image to an outpainted region of the extrapolated image. The computer-implemented method further involves synthesizing the extrapolated image based on the extrapolated semantic label map and the panoptic label map. The extrapolated image includes the outpainted region, which further includes the mean characteristics and at least one of the output instances. The computer-implemented method further includes rendering, using a rendering module, the extrapolated image.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
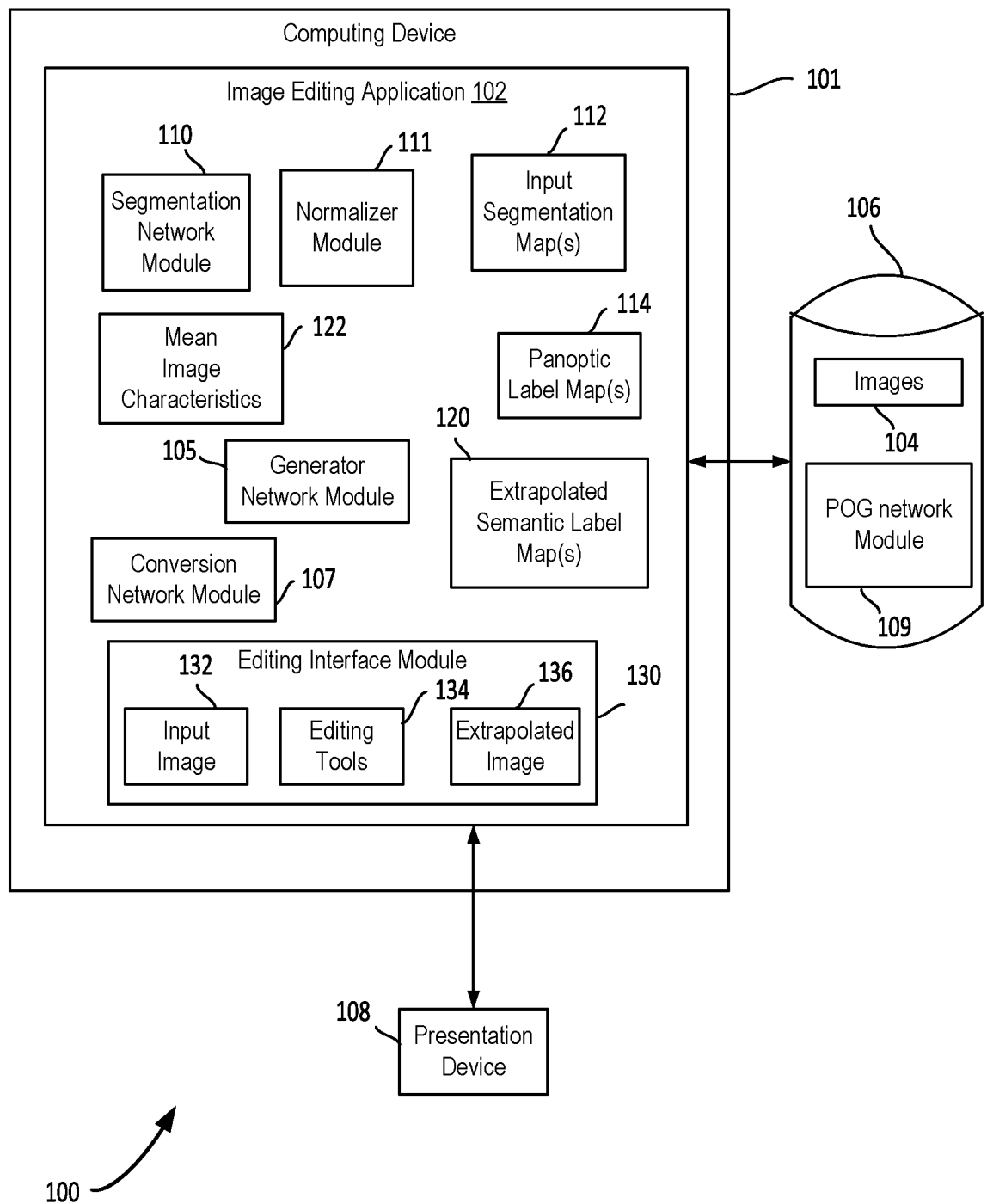
FIG. 1 is a diagram showing an example of a computing environment for semantically-aware image extrapolation, according to certain embodiments.

As described above, existing methods of image extrapolation provide mechanisms to outpaint beyond the borders of an existing image. Either background features and instances of objects in the original image can be automatically or semi-automatically duplicated, or more unique features and objects can be outpainted with more intense manual input. The adding of more diverse objects or more interesting background features must typically be accomplished manually with attention paid to the semantics, or the nature and identification of the various features, of the original image. Thus, existing image-extrapolation techniques are either labor-intensive or produce extrapolated images that lack saliency and realism. Embodiments described herein address these issues by using machine-learning-based object generation and instance-aware image normalization. The machine-learning-based object generation and instance-aware normalization can be used to automatically extrapolate an image in the semantic label space in order to generate visually complex, pleasing images. An automated image extrapolation feature of an image editing application can be invoked to provide the machine-learning-based object generation and instance-aware normalization as needed to convert a captured, digital photograph or any other input image into a realistic, extrapolated image that includes outpainted textures and features that blend with the original input image in a realistic fashion. These techniques provide for the automated generation of an extrapolated image in a way that respects the semantics of the original image. The object generation automatically provides realistic, unique instances of objects and features to be included in the outpainted region of an extrapolated image and can therefore be highly effective for more complex subjects, such as architectural interiors or street scenes. The normalization transfers characteristics from the original image to the outpainted region while respecting generated instances of objects to maintain visual continuity between the original image and the outpainted region of the extrapolated image. Outpainted objects and features in an extrapolated image can thus be relatively unique while maintaining consistency and saliency with respect to the nature and content of the original image, all with little or no manual effort.

For example, an image editing application is loaded with an original digital image, such as an image captured with a digital camera, smartphone, or scanner. Upon invocation of an image extrapolation process by input received at a computing system running the application, for example, through an input device or from some other process running on the system, the image editing application identifies, segments, or objects in the original digital image and produces a map of the instances of the objects within the original image. The image editing application uses this input image segmentation map and a pre-trained object generation network to generate a semantic label map for an extrapolated image. A label in the semantic label map indicates an instance of an object in the final image. The mapped instances include both instances from the original image and instances of highly-plausible objects that will occur in the outpainted region of the extrapolated image. Object identification is provided by a trained neural network that can determine the type of scene represented and select classes of objects to be generated for the outpainted portion of the final image. For example, the network may determine that a scene is likely a traffic scene, and thus, objects from the class "vehicles" should ultimately be provided for the outpainted region of the extrapolated image. An additional map, referred to as a panoptic label map, is generated to identify precise boundaries of the instances of objects that are to be depicted in the extrapolated image and to deal with partial instances of objects at the edges of the original image frame.

In some examples, the image editing application uses an instance-aware context normalizer to transfer one or more characteristics, such a an average color, from the original image to the outpainted region of the extrapolated image. The image editing application then synthesizes the extrapolated output image based the various maps and the normalized image characteristic(s). The extrapolated image includes the original input image and an outpainted region; however, there is no boundary between these two regions. The image appears sharp and contiguous and may include a variety of visual objects and background elements. All of these features appear as though they were captured together, possessing a high degree of clarity and a visually pleasing level of saliency. The extrapolated image can be rendered, for example, on an output device such as a display or a printer. The extrapolated image may also, or alternatively, be stored for future use.

The use of a pre-trained object generation network along with semantic mapping and instance-aware context normalization in certain embodiments provides the capability to automatically extrapolate an image in the semantic label space in order to generate unique objects and consistent color and texture in the extrapolated region. The use of a panoptic label map facilitates the generation of high quality boundaries in the extrapolated image. In some embodiments, patch co-occurrence discrimination can also be used to further improve the texture consistency of the extrapolated image. Automatic image extrapolation as described in example embodiments provides visually complex, pleasing images when compared with those automatically produced with prior techniques and without significant manual effort.

FIG. 1 is a diagram showing an example of a computing environment 100 for semantically-aware image extrapolation, according to certain embodiments. The computing environment 100 includes a computing device 101 that executes an image editing application 102, a memory device 106 configured to store images 104, and a presentation device 108 that is controlled based on the image editing application 102. In this example, the image editing application 102 includes generator network module 105, conversion network module 107, and segmentation network module 110. In some examples, segmentation network module 110 includes a deep-generative neural network that is part of image editing application 102. Segmentation network module 110 may also be based on a publically available trained network. The segmentation network module 110 produces instance segmentation maps 112 of input images. An instance is a specific object within a class of objects. The input images may be retrieved from images 104.

Image editing application 102 uses an input segmentation map 112 as well as peripheral object generation (POG) network module 109 to generate a panoptic label map 114 and an extrapolated semantic label map 120. These maps can be used to define instances of objects that will occur in the outpainted region of the extrapolated image. The POG network is trained with real-world images to identify likely classes of objects needed for the outpainted region of an extrapolated image. For example, the POG network module 109 may determine that a scene is likely an interior room, thus, objects from the class "furniture" should ultimately be generated and inserted into the outpainted region of the extrapolated image. In some examples, POG network module 109 uses a deep-generative neural network. The POG network may be a publically available trained network accessed over the Internet or a remotely stored or locally stored network trained for a specific image editing application.

The image editing application 102 in this example also includes a normalizer module 111. In some examples, normalizer module 111 is an instance-aware context normalizer. Normalizer module 111 is used to produce one or more mean image characteristics 122 from the input image to transfer to the outpainted region of the extrapolated image. A mean characteristic, as an example, may be a mean color, and a mean color may be provided for each object instance in the input image that has been included in the relevant input segmentation map.

The image editing application 102 also generates includes an image editing interface module 130. In some embodiments, the image editing application 102 uses inputs related to editing tools 134 received via the image editing interface module 130 to control one or more operations of the image editing application 102. The editing tools 134 in this example include an automatic image extrapolation tool (not shown). The image editing application 102 provides the editing interface for display at a presentation device 108, which can be a local presentation device or a computing device that is remotely accessible over a data network. The image editing application includes one or more software modules, for example, a rendering module (not shown) that render images, such as input image 132 and extrapolated image 136 for display in the editing interface module 130.

Figure 2:
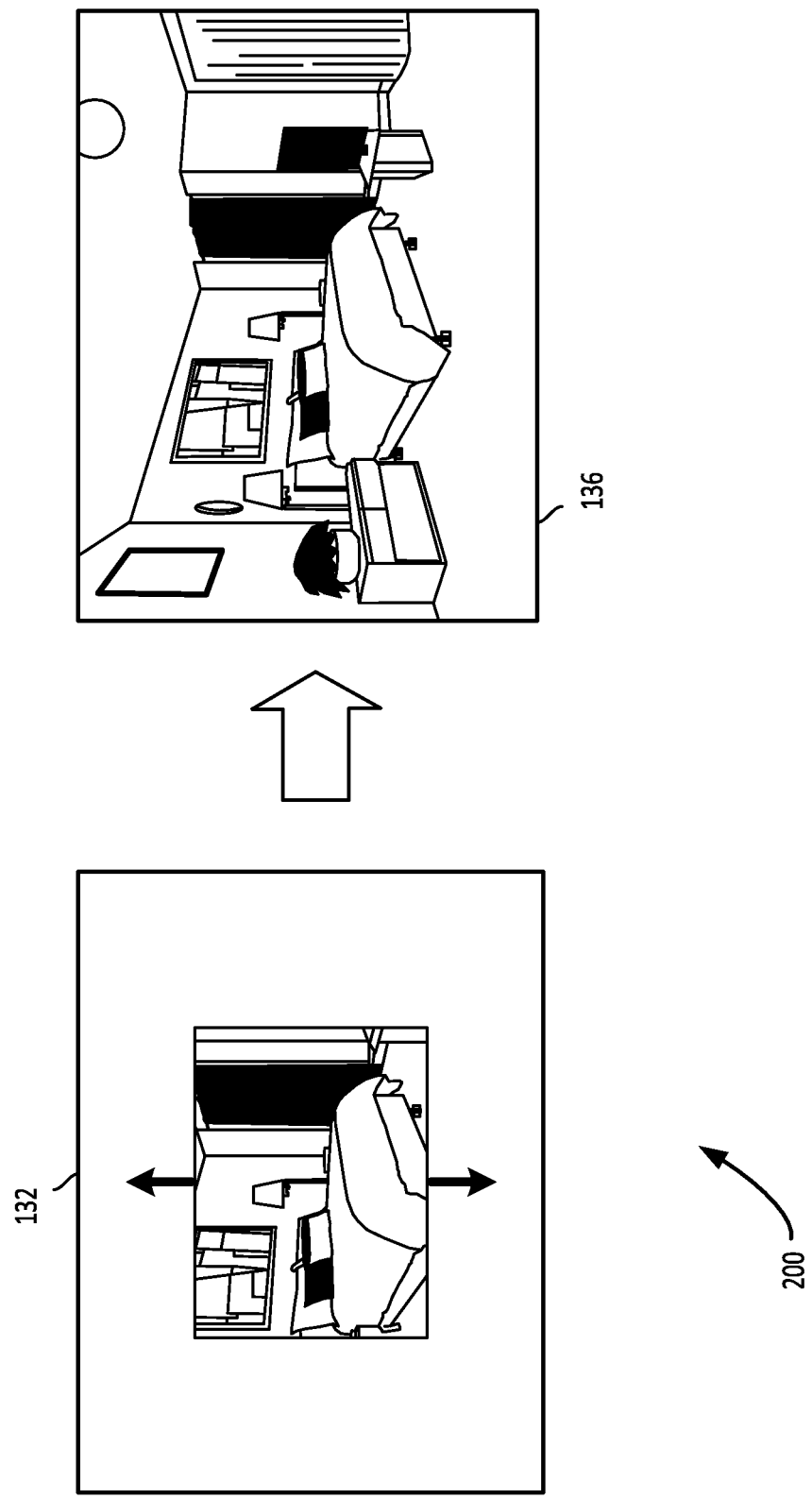
FIG. 2 is an example of corresponding input and extrapolated images, where the extrapolated image includes an outpainted region produced by semantically-aware image extrapolation, according to certain embodiments.

FIG. 2 is an example 200 of corresponding input and extrapolated images, where the extrapolated image includes an outpainted region produced by semantically-aware image extrapolation, according to certain embodiments. Input image 132 covers only a relatively small portion of an architectural room interior, more specifically, a furnished bedroom. Semantically-aware image extrapolation, in certain embodiments, can be used to synthesize and render a realistic extrapolated image 136. Image 136 includes objects, textures, and features in a region that has been outpainted as indicated by the arrows in input image 132. Some of these features will be referred to in the description of FIG. 3, below.

Figure 3:
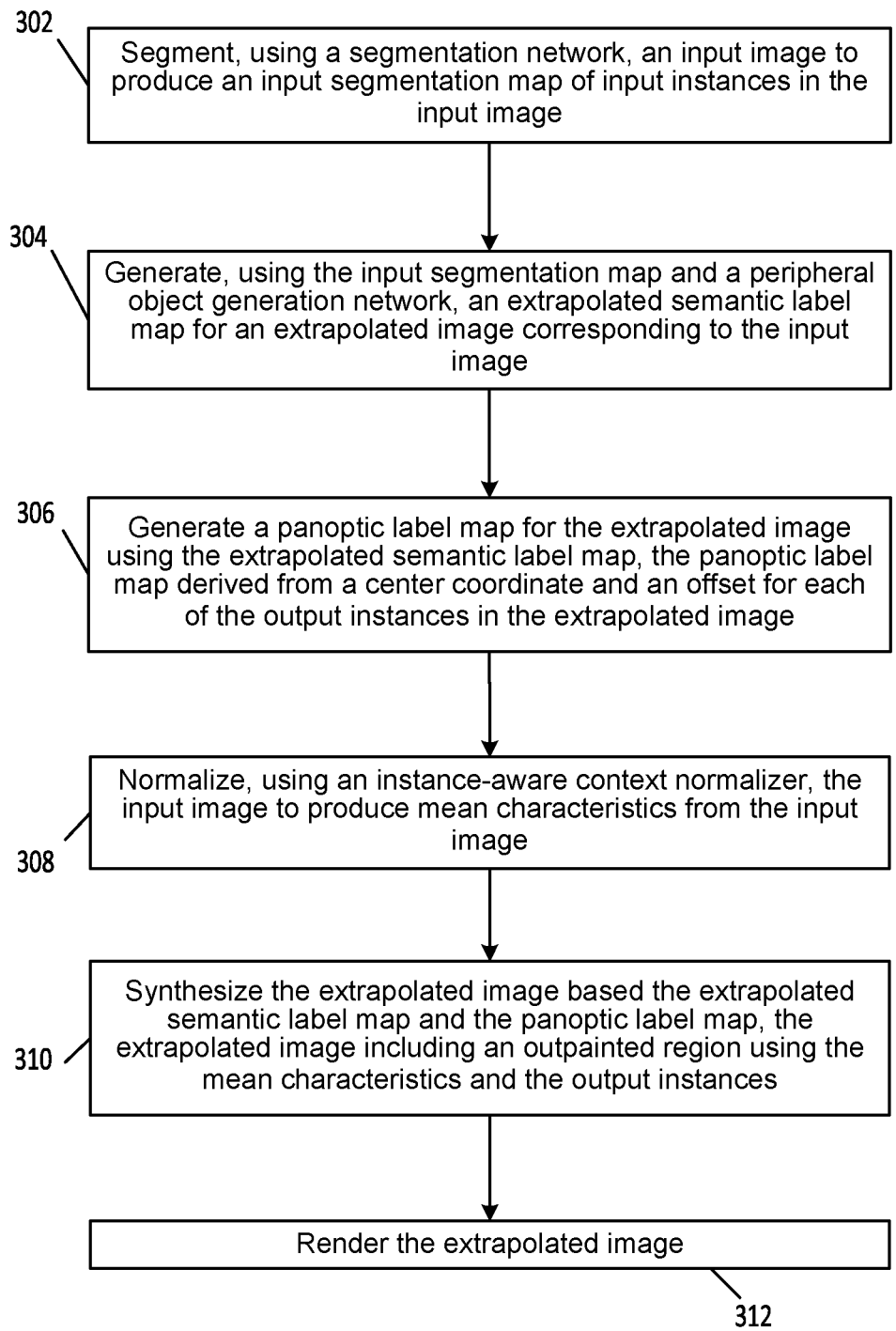
FIG. 3 is a flowchart of an example of a process for semantically-aware image extrapolation, according to some embodiments.

FIG. 3 is a flowchart of an example of a process 300 for semantically-aware image extrapolation, according to some embodiments. In this example, a computing device carries out the process by executing suitable program code, for example, computer program code executable to provide an image editing application such as image editing application 102. At block 302, the computing device segments an input image to produce an input segmentation map of input instances within the input image. In this example, the computing device uses a segmentation network such as segmentation network module 110 in segment an input image. As an example, input image 132 includes instances such as those of a lamp, pillows, curtains, a bed, etc. At block 304, the computing device generates an extrapolated semantic label map for an extrapolated image corresponding to the input image. The computing device uses the input segmentation map and a POG network to generate the extrapolated semantic label map. The extrapolated semantic label map includes labels for instances of objects in both the original image and an outpainted region. As an example, object instances in the outpainted region of extrapolated image 136 include a television, an additional lamp, additional curtains, etc.

At block 306, the computing device generates a panoptic label map for the extrapolated image using the extrapolated semantic label map. The panoptic label map is derived from a center coordinate an offset for each of at least some of the output instances in the extrapolated image. Output instances of objects mapped include those in the original image, plus objects produced by the POG network for an outpainted region in the extrapolated image. The panoptic label map can be used to more precisely locate and define proposed instances of objects. The panoptic label map can also be used to complete partial instances of objects. A partial instance of an object is a portion of an object that appears near the edge of the original frame. For example, input image 132 includes a partial instance of the wall hanging and a partial instance of the television stand. In order for the extrapolated image to appear realistic, a portion of the object that appears in the outpainted region must blend with the portion and the original image in a realistic fashion.

Staying with FIG. 3, at block 308, the computing device uses an instance-aware context normalizer to normalize the input image and produce mean characteristics from the input image. For example, the computing device 101 includes instance-aware context normalizer module 111. One or more mean characteristics are transferred to the outpainted region of the extrapolated image in order to improve the quality of the semantic match between the outpainted region in the original image. Since the normalizer is instance aware, it takes into account discontinuities in characteristics such as color brought about by the presence of objects in the image. For example, a mean characteristic, such as a mean color for a similar object, may be transferred from the original image to the outpainted region. In the example of FIG. 2, the mean color of the floor and decor may be transferred. At block 310, the computing device synthesizes the extrapolated image based on the extrapolated semantic label map and the panoptic label map. The extrapolated image includes the outpainted region with output instances provided by the POG network and mean characteristics of the input image. The extrapolated image can then be rendered at block 312. For example, extrapolated image 136 may be rendered through editing interface module 130 on presentation device 108.

Figure 4:
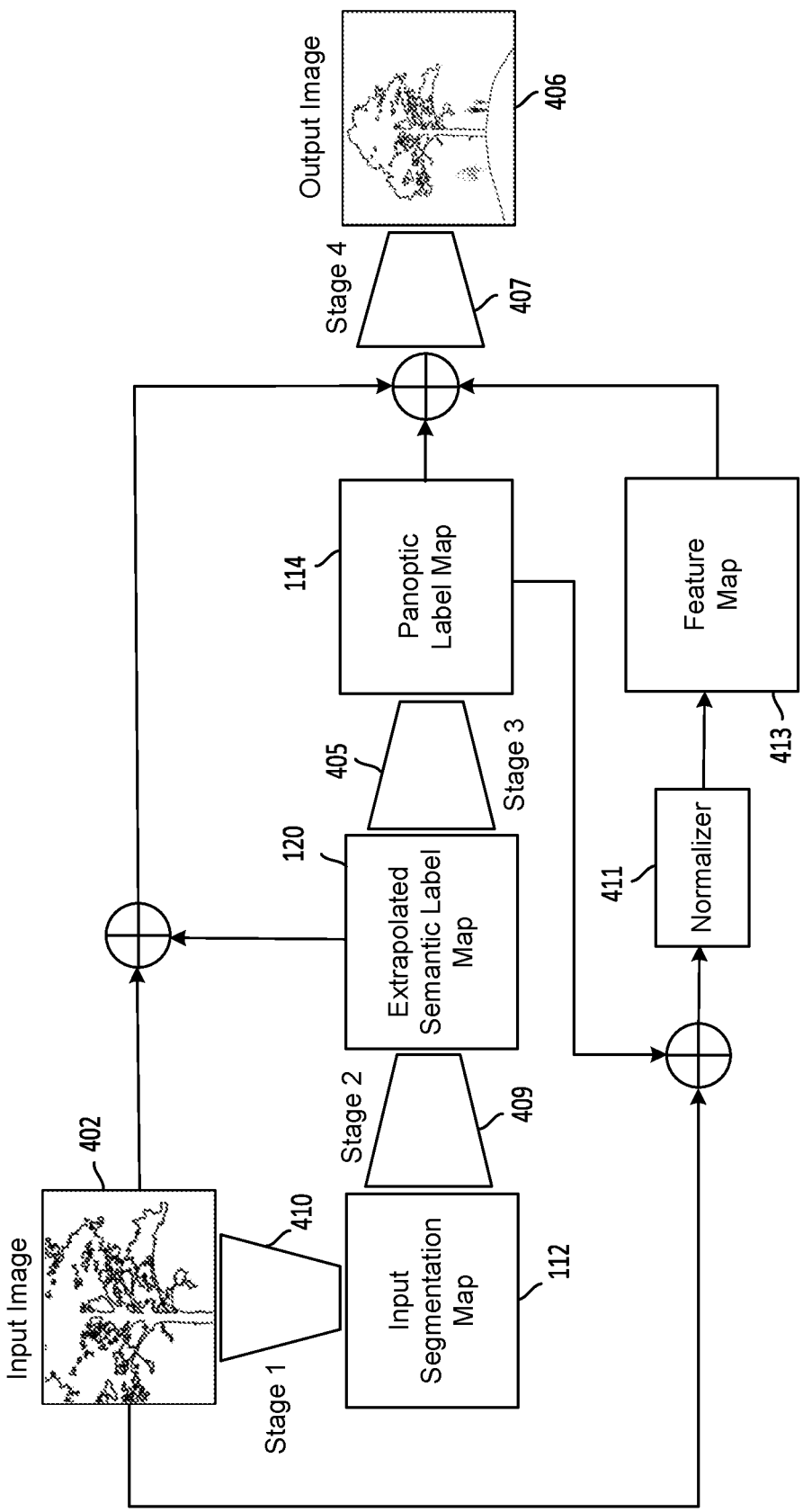
FIG. 4 is a block diagram of an example of a processing pipeline that provides semantically-aware image extrapolation, according to certain embodiments.

FIG. 4 is a block diagram of an example of a processing pipeline 400 that provides semantically-aware image extrapolation, according to certain embodiments. In pipeline 400, input image 402 is processed by segmentation network 410 to produce input segmentation map 112. As examples, segmentation of the input image can be provided by a pyramid scene parsing network, a split-attention network, or by using context-prior scene segmentation. The segmentation of the input image 402 by segmentation network 410 may be alternatively referred to herein as stage 1 of pipeline 400. After stage 1, POG network 409 semantically extrapolates the input segmentation map 112 to form the extrapolated semantic label map 120. The formation of the extrapolated semantic label map 120 using POG network 409 may be alternatively referred to herein as stage 2 of pipeline 400. POG network 409, in some examples, is based on a spatially adaptive (SPADE) neural network. A SPADE network modulates activations in normalization layers of the network through spatially adaptive machine learning.

An example training algorithm for the stage 2 network is shown as Algorithm 1 at the end of this description. In this example, to train the stage 2 network, a ground truth segmentation map $S_{gt}$, ground truth panoptic map $P_{gt}$, and a cropped segmentation map $S_{gt}^c$ (obtained from stage 1) are used as the inputs. Segmentation map, $S_{gt}^z$, of desired resolution is obtained by zero-padding $S_{gt}^c$. An instance boundary map, B, is created from $P_{gt}$. Extrapolated segmentation map $S_{pog}$ is generated using the generator $G^2$, which has an extra output channel (apart from the input classes) for the boundary map. The multiscale discriminator, $D_{multiscale}^2$ distinguishes between the generated segmentation map ($S_{pog}$) and the ground truth segmentation map ($S_{gt}$). The algorithm minimizes a training objective function, discussed below with reference to FIG. 5, for semantic label map extrapolation. The parameters of $G^2$ and $D_{multiscale}^2$ are updated accordingly.

In order to provide regularization during training, the POG network can be explicitly supervised with a ground truth instance boundary map. The POG network can be trained using a multiscale discriminator that operates on the input and proposed semantic label maps. The multiscale discriminator provides for the capture of object co-occurrence information at various scales. Instead of using the regular loss that would be applied when making typical GAN-based predictions, least squares GAN loss can be used. Focal loss can be used to compute the discrepancy between the ground truth instance boundary map and the output of the POG network to refine the extrapolated semantic label map. Higher weight can be given to hard-to-generate object classes, and the use of the focal loss allows generation of some rare object classes. The focal loss between the ground truth and the output at any location is given by the following equation. The final focal loss, $\mathcal{L}_{FL}^{all}$ is given by the sum of focal losses across all locations in the semantic label map, $$l(z,y) = -y \times \log(z)$$

$$\mathcal{L}_{CE}(z,y) = \Sigma_{h,w,c} l(z,y)$$

$$\mathcal{L}_{FL}(z,y) = \Sigma_{h,w,c} l(z,y) \times (1-z)^\gamma.$$

The following training objective is used in this example for semantic label map extrapolation (here for clarity, only the generator losses are shown), $$\mathcal{L}_{gen} \mathcal{L}_{GAN} + \mathcal{L}_{FM} + \lambda_{FL} \mathcal{L}_{FL}^{all} + \lambda_{CE} \mathcal{L}_{CE},$$

where $\mathcal{L}_{CE}$ is the cross-entropy loss between the ground truth instance boundary and the corresponding output channel in the POG network, and $\mathcal{L}_{FM}$ is the discriminator feature matching loss.

Continuing with FIG. 4, panoptic label map 114 is generated by predicting class agnostic instance centers and pixel-wise offsets from the centers of the instances they belong to. Panoptic label map 114 is used to transfer texture for the extrapolated instances, as well as to obtain crisp and precise boundaries between object instances. In this example, a generator network 405 is used to produce the panoptic label map. Generator network 405 is based on SPADE residual blocks. The generator network in this example is trained by the extrapolated segmentation map itself and produces heat maps for instance centers and the pixel-wise offsets from the nearest instant center. The panoptic label map 114 is thus derived from a center coordinate and offset for each of at least some of the output instances in the extrapolated image. The center heat maps and the offset outputs can be further processed along with the segmentation map to obtain the instance maps. This estimate of the panoptic label map provides a way to find object instances that are extrapolated from the input image 402 and the instances that are newly created. The formation of the panoptic label map using network 405 may be alternatively referred to herein as stage 3 of pipeline 400.

To form output image 406, the computing device converts the extrapolated semantic label map back into a color image. This final conversion may be referred to alternatively herein as stage 4 four of pipeline 400. The stage 4 conversion network 407 in this example is also based on SPADE residual blocks. The input to conversion network 407 is the concatenation of a feature map 413 that is output by normalizer 411, the input image 402, and a boundary map (not shown) derived from panoptic label map 114. Instance-aware context normalizer 411 provides texture consistency of output image 406 while maintaining identical mapping of the input image 402 to the corresponding portion of output image 406.

In one example, to train the stage 4 network (as shown in Algorithm 2 the end of this description), $X_{com}$ is obtained by concatenating ground truth segmentation map ($S_{gt}$), input image ($X_{gt}^c$), the boundary map obtained from a ground truth instance map, and the feature map 413 obtained using the normalizer. The extrapolated image (Y) is generated using the generator of stage 4, $G^4$, which takes in $X_{com}$ and the encoded input image ($E^4(X_{gt}^c)$). The multiscale discriminator $D_{multiscale}^2$ distinguishes between the generated image (Y) and the ground truth image ($X_{gt}$). A patch co-occurrence discriminator, discussed in more detail below with reference to FIG. 6, distinguishes between image patches, and the final objective function is minimized to update the parameters of $G^4$, $E^4$, $D_{multiscale}$, and $D_{patch}^2$.

Instance-aware context normalizer 411 provides one or more mean characteristics from input image 402. For example, a mean color for the entire input image, or for individual object instances, may be provided by instance-aware context normalizer 411. Providing mean characteristics to the outpainted region directly may not provide good results for complex images. Therefore, the instance-aware context normalizer takes into account the input image 402 and the input segmentation map 112. Since texture inconsistency occurs mainly for partial instances of objects, texture features are computed specifically for those instances. These texture features are included in feature map 413, which is concatenated with the panoptic label map and the input image for processing by the residual blocks of network 407.

Figure 5:
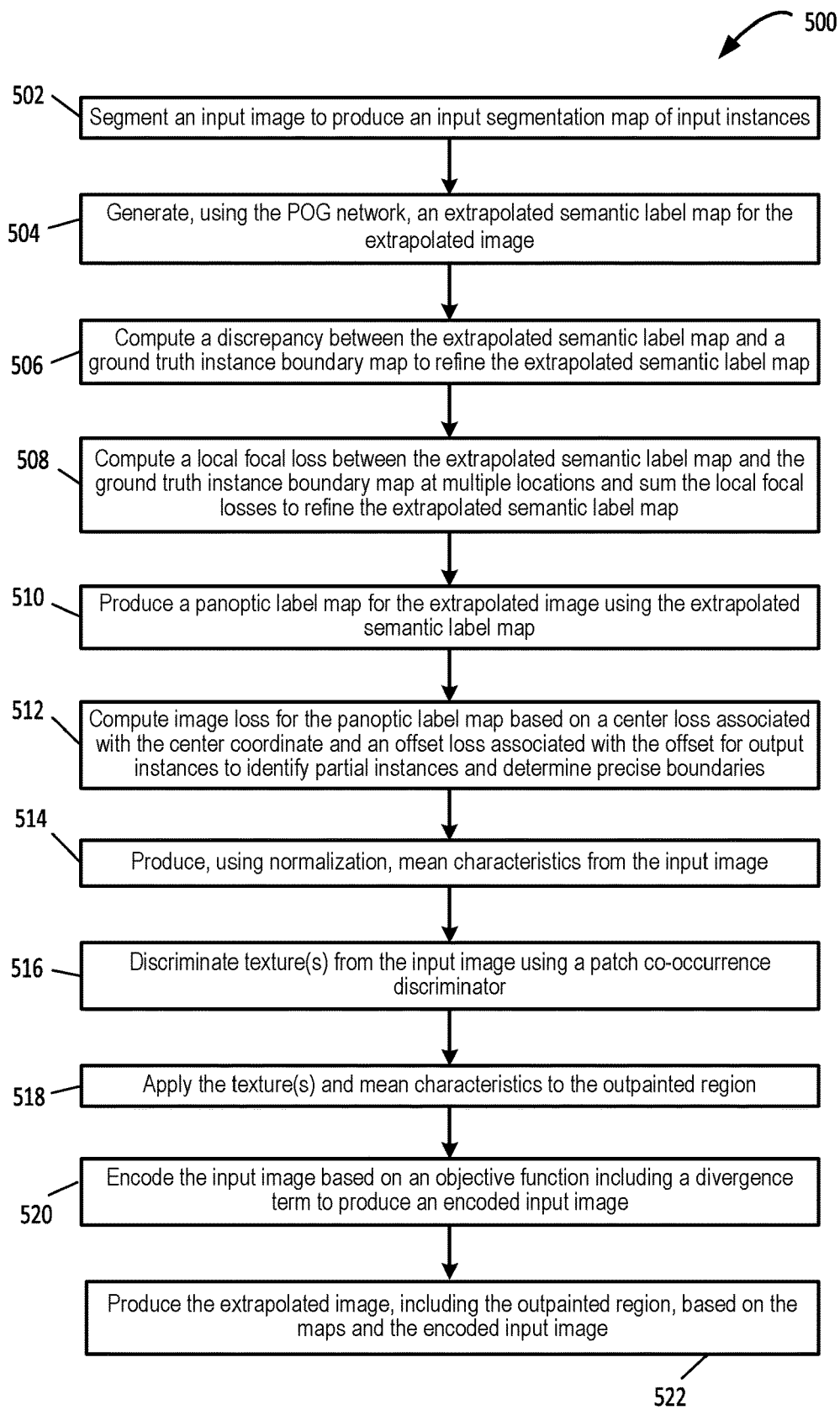
FIG. 5 is a flowchart of another example of a process for semantically-aware image extrapolation, according to some embodiments.

FIG. 5 is a flowchart of another example of a process 500 for semantically-aware image extrapolation, according to some embodiments. In this example, a computing device carries out the process by executing suitable program code, for example, computer program code for an image editing application, such as image editing application 102. The program code may cause the computing device to implement a pipeline such as pipeline 400. At block 502, the computing device segments the input image to produce an input segmentation map such as described with respect to stage 1 of pipeline 400. As one example, this segmentation is accomplished using a pyramid scene parsing network. At block 504, the computing device generates the extrapolated semantic label map for the extrapolated image. In some examples, the extrapolated semantic label map 120 is generated as described with respect to stage 2 of pipeline 400. In one example, generating the semantic label map is accomplished using semantic manipulation with a conditional GAN. At block 506, the computing device computes a discrepancy between the extrapolated semantic label map 120 and a ground truth instance boundary map in order to refine the extrapolated semantic label map. At block 508, the computing device computes a local focal loss between the extrapolated semantic label map and the ground truth instance boundary map at multiple locations. The local focal losses are summed, and the summed value is used to refine the extrapolated semantic label map.

In one example, the objective function for stage 2 include four losses: GAN loss, discriminator feature matching loss, focal loss and cross-entropy loss. For GAN loss, the GAN hinge loss is replaced with the least square loss ($\mathcal{L}_{GAN}$). $S_{gt}^c$ is the semantic label map corresponding to the input image, and $S_{gt}$ is the corresponding extrapolated ground truth semantic label map. B is the ground truth boundary map obtained from the ground truth instance map, $P_{gt}$. $S_{com}$ is a channel-wise concatenation of $S_{gt}$ and B. $S_{pog}$ is the combined extrapolated sematic label map and boundary map synthesized by $G^2$. For stability in GAN training, the feature matching loss $\mathcal{L}_{FM}$ is defined as, $$\mathcal{L}_{FM} = \sum \frac{1}{N_i} [\|D^{2(i)}(S_{com}) - D^{2(i)}(S_{pog})\|_1],$$

where $D^{2(i)}$ represents the i-th layer of discriminator $D^2$ with $N_i$ elements. In order to account for representation of rare semantic classes in the generated semantic label map, focal loss $\mathcal{L}_{FL}$ is defined as, $$\mathcal{L}_{FL} = \sum_{h,w,c} l(z, y) \times (1-z)^\gamma.$$

The training objective function is therefor $\mathcal{L}_2$, which is, $$\mathcal{L}_2 = \min_{G^2}(\mathcal{L}_{GAN} + \lambda_{FM}\mathcal{L}_{FM} + \lambda_{CE}\mathcal{L}_{CE} + \lambda_{FL}\mathcal{L}_{FL}).$$

At block 510 of process 500, the computing device produces the panoptic label map 114 for the extrapolated image using the extrapolated semantic label map 120. The generation of the panoptic label map, as an example, may be accomplished as described with respect to stage 3 of pipeline 400. At block 512, the computing device computes an image loss for the panoptic label map based on a central loss associated with the center coordinate and also loss associated with the offset for output image instances. This computation provides for the identification of partial instances and also for the determination of precise boundaries of instances that are to appear in the output image. The functions included in block 506 through block 510 and discussed with respect to FIG. 5 can be used in implementing a step for generating the panoptic label map for the extrapolated image using the extrapolated semantic label map.

To obtain a panoptic label map from the output of stage 2 without access to the extrapolated image, two parallel processing branches are created. One is for a semantic label map, and the other is for a pixel-wise instance center coordinate map and an x-y offset map of x and y offsets from the instance centers. These predicted center maps and the offset maps are used in conjunction with semantic label maps to obtain a final panoptic label map. For the panoptic segmentation, class-agnostic instance centers and offsets from the instance centers for every location are obtained. The phrase, "class-agnostic instance center" refers to a center location for each of the different instances being considered that belong to the same category. In addition, for every pixel that belongs to the same category, the x-offsets and y-offsets are defined as $\delta x$ and $\delta y$, respectively, of that pixel location from the center of the instance to which the pixel belongs. In this example, instead of using the above-mentioned two parallel branches directly, an additional network is trained to obtain the center maps, and the offset maps from the semantically extrapolated label maps that are the outputs of stage 2. The ground truth center maps are represented by Gaussian blobs with a standard deviation of eight pixels centered at the instance centers. $L_2$ loss (the loss for the extrapolated image) is used to compute the instance center loss, and $L_1$ loss (the loss for the original image) is used to compute the offset losses. The final loss for stage-3 is the weighted sum of the center loss and the offset losses.

The initial panoptic map is tested by using a baseline segmentation for bottom-up panoptic segmentation in order to group pixels based on the predicted centers and offsets to form instance masks. The instance masks and the semantic label map (the input to stage-3) are combined by majority voting to obtain the final panoptic label map. An example testing algorithm is shown as Algorithm 3 at the end of this description. The input segmentation map $S_c$ corresponding to input image X is obtained from the pyramid scene parsing network, PSPNet in stage 1. The extrapolated semantic label map $S_{pog}$ is generated from generator $G^2$ of stage 2. $S_{pog}$ is fed into stage 3 to obtain panoptic label map P'. $S_{pog}$, $X_{gt}^c$, the boundary map obtained from P', and the output of the normalizer are concatenated into $X'_{com}$, which is given as input to generator $G^4$ in stage 4 to generate the extrapolated RGB image Y.

Still referring to FIG. 5, at block 514, one or more mean characteristics are produced from the input image to be applied for the outpainted region of the extrapolated image. In one example, mean color is used. The panoptic label map is used to obtain partial instances. Partial instances refer to the instances which are part of the input image and need to be completed in the final extrapolated image. The per-channel (for RGB) mean color for a partial instance is calculated as the mean pixel value of all the pixels belonging to that instance. The feature map 413 is obtained by copying these mean colors (per-channel) to their respective extrapolated part of the partial instances in the outpainted region. For all the instances that do not belong to partial instances, the feature map values are zero.

At block 516, the computing device discriminates textures from the input image using a patch co-occurrence discriminator. Further details of the operation of the patch co-occurrence discriminator are described below with reference to FIG. 6. At block 518, the textures and mean characteristics are applied to the outpainted region of the extrapolated image. The functions included in block 514 through block 518 and discussed with respect to FIG. 5 can be used in implementing a step for normalizing the input image to apply mean characteristics from the input image to the outpainted region of the extrapolated image. In this example, the computing device uses instance-aware context normalizer module 111. One or more mean characteristics are transferred to the outpainted region of the extrapolated image. At block 520, the input image is encoded based on an objective function including a divergence loss term in order to produce and encoded input image. To ensure appropriate style transfer, the output of an encoder that processes a cropped image is fed into the generator. This encoder forms a variational autoencoder with the generator.

At block 522, the computing device synthesizes the extrapolated, output image, including the outpainted region. The computing device makes use of the maps and the encoded input image to produce the extrapolated image. In one example, image synthesis with a conditional GAN is used. The final training objective function is, $$\min_G(\mathcal{L}_{GAN} + \lambda_{FM}\mathcal{L}_{FM} + \lambda_{VGG}\mathcal{L}_{VGG} + \lambda_{KLD}\mathcal{L}_{KLD} + \mathcal{L}_{CooccurGAN}).$$

Aspects and features of synthesizing the output image include those described with respect to stage 4 of pipeline 400. The functions included in block 520 and block 522 and discussed with respect to FIG. 5 can be used in implementing a step for synthesizing the extrapolated image based on the extrapolated semantic label map and the panoptic label map.

The objective function for stage 4 includes five losses: GAN loss, discriminator feature mapping loss, perceptual loss, KL-divergence loss, and patch co-occurrence loss. For GAN loss $\mathcal{L}_{GAN}$, hinge loss can be used. $X_{gt}^c$ is the input image. $X_{gt}$ is the extrapolated ground truth image. $S_{gt}$ is the ground truth semantic label map, and $P_{gt}$ is the ground truth instance map corresponding to $S_{gt}$. $X_{com}$ is a channel-wise concatenation of $X_{gt}^c$, $S_{gt}$, a boundary map obtained from $P_{gt}$, and the output of the normalizer. Y is the extrapolated RGB image synthesized by $G^4$. For stability, the feature mapping loss $\mathcal{L}_{FM}$ is defined as, $\mathcal{L}$ $$\mathcal{L}_{FM} = \sum_i \frac{1}{N_i} [\|D^{4(i)}(X_{gt}^c) - D^{4(i)}(Y)\|_1],$$

where $D^{4(i)}$ represents the i-th layer of discriminator $D^4$ with $N_i$ elements.

For perceptual loss, a content loss function such as VGG19 can be used as a feature extractor to minimize the $L_1$ loss between features extracted for Z' and Y. Perceptual loss ($\mathcal{L}_{VGG}$) can be defined as, $$\mathcal{L}_{VGG} = \sum_i \frac{1}{N_i} [\|\Phi^{(i)}(X_{gt}^c) - \Phi^{(i)}(Y)\|_1]$$

where $\Phi^i$ denotes the i-th layer of the VGG19 network. KL divergence loss ($\mathcal{L}_{KLD}$) is defined as, $$\mathcal{L}_{KLD} = \mathbb{D}_{\mathbb{KL}}(q(z|x)\|p(z))$$

where q is a variation distribution and p(z) is a standard Gaussian distribution. In some examples, a patch co-occurrence discriminator (described in more detail below) is used in addition to the multiscale discriminator. The patch co-occurrence discriminator loss $\mathcal{L}_{CooccurGAN}$ is defined as, $$\mathcal{L}_{CooccurGAN} = \mathbb{E}_{Y,X_{gt}^c}[-\log(D_{patch}^4(\text{crop}(G(Y)), \text{crop}(X_{gt}^c), \text{crops}(X_{gt}^c)))],$$

where the crop($X_{gt}^c$) function takes a random patch from image $X_{gt}^c$ and crops($X_{gt}^c$) takes four random patches from image $X_{gt}^c$. The random patches serve as the reference patches. The overall objective function for stage 4 is $\mathcal{L}_4$, $$\mathcal{L}_4 = \min_{G^4}(\mathcal{L}_{GAN} + \lambda_{FM}\mathcal{L}_{FM} + \lambda_{VGG}\mathcal{L}_{VGG} + \lambda_{VGG}\mathcal{L}_{VGG} + \mathcal{L}_{CooccurGAN}).$$

Figure 6:
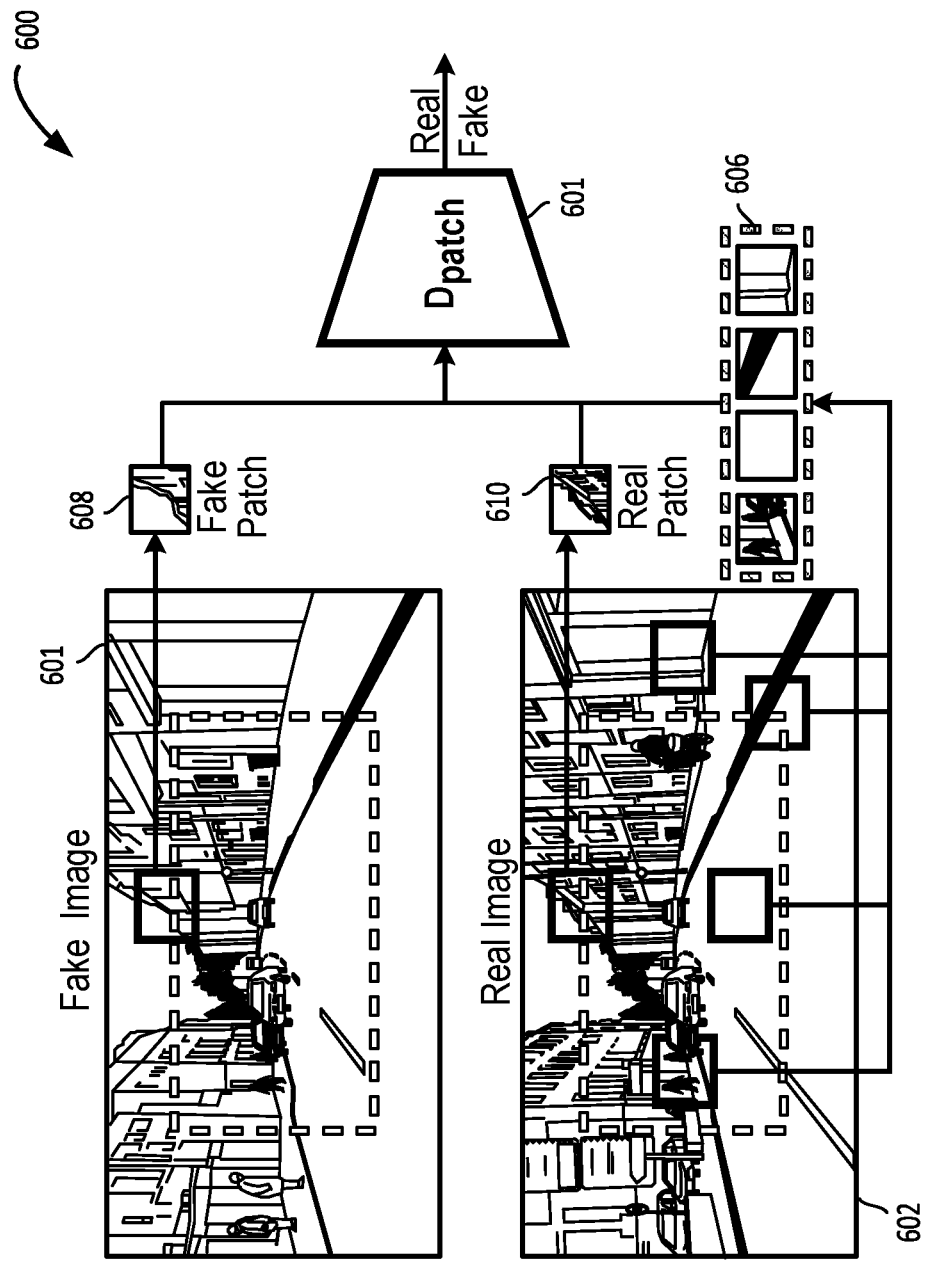
FIG. 6 is a block diagram of a patch co-occurrence discrimination process that provides semantically-aware image extrapolation, according to certain embodiments.

In these examples, a traditional multi-scale image discriminator is used in addition to the patch co-occurrence discriminator. A multi-scale image discriminator can be used by itself. However, the use of the patch co-occurrence discriminator provides for better texture transfer from the input image to the outpainted region of the extrapolated image. FIG. 6 is a block diagram of a patch co-occurrence discrimination process 600. Patch co-occurrence discriminator module 601 takes as input, real image 602, and fake image 604. Discriminator module 601 also takes as input a group of reference patches 606. Patch discriminator module 601 also takes into account a fake patch 608 from the fake image 604 and a real patch 610 from the real image 602. In some examples, the real patch and the fake patch are the same patches, randomly selected but using some part of the inside of the input image while another part is from the outpainted region of both the real image and the fake image. The discriminator tries to distinguish between fake patch 608 and real patch 610 by making use of the reference patches 606. In one example, 64×64 pixel patches are used.

To use the patch co-occurrence discriminator, the outpainted region of the extrapolated image, as opposed to the whole image, is treated as a target image, leading to, $$\mathcal{L}_{CooccurGAN} = (G, D_{patch}) = \mathbb{E}_{x,y}[-\log(D_{patch}(\text{crop}(G(x)), \text{crop}(y), \text{crops}(y)))].$$

Here, x is the input and y is the corresponding ground truth image. The crop(y) function takes random patches of 64×64 pixels from image y and crops(y) takes the four random reference patches 606 from image y.

Figure 7:
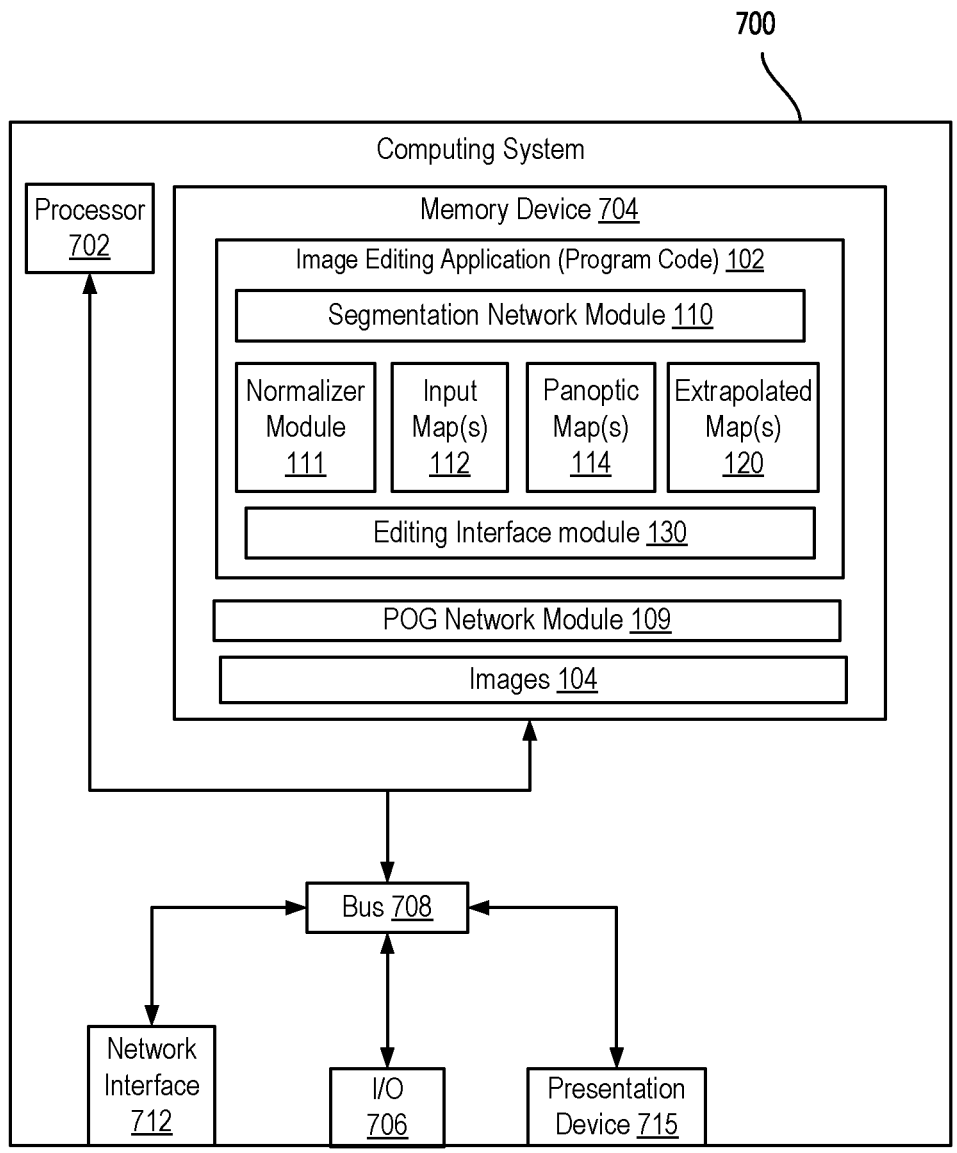
FIG. 7 is a diagram of an example of a computing system that can implement aspects of semantically-aware image extrapolation, according to certain embodiments.

FIG. 7 depicts a computing system 700 that executes the image editing application 102 with the capability of semantically-aware image extrapolation according to embodiments described herein. System 700 includes a processor 702 communicatively coupled to one or more memory devices 704. The processor 702 executes computer-executable program code stored in the memory device 704. Examples of the processor 702 include a microprocessor, an application-specific integrated circuit ("ASIC"), a field-programmable gate array ("FPGA"), or any other suitable processing device. The processor 702 can include any number of processing devices, including a single processing device. The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 7, the computing system 700 may also include a number of external or internal devices, for example, input or output devices. For example, the computing system 700 is shown with one or more input/output ("I/O") interfaces 706. An I/O interface 706 can receive input from input devices or provide output to output devices (not shown). One or more buses 708 are also included in the computing system 700. The bus 708 communicatively couples one or more components of a respective one of the computing system 700. The processor 702 executes program code that configures the computing system 700 to perform one or more of the operations described herein. The program code includes, for example, image editing application 102 or other suitable applications that perform one or more operations described herein. The program code may be resident in the memory device 704 or any suitable computer-readable medium and may be executed by the processor 702 or any other suitable processor. Memory device 704, during operation of the computing system, executable portions of the image editing application, for example, segmentation network module 110 and/or normalizer module 111, and editing interface module 130 can access portions as needed. Memory device 704 is also used to temporarily store input maps 112, panoptic maps 114, and extrapolated maps 120, as well as other information or data structures, shown or not shown in FIG. 7. Memory device 704 can also store POG network module 109, or portions thereof, for the specific image editing job in progress.

The system 700 of FIG. 7 also includes a network interface device 712. The network interface device 712 includes any device or group of devices suitable for establishing a wired or wireless data connection to one or more data networks. Non-limiting examples of the network interface device 712 include an Ethernet network adapter, a wireless network adapter, and/or the like. The system 700 is able to communicate with one or more other computing devices (e.g., another computing device executing other software, not shown) via a data network (not shown) using the network interface device 712. Network interface device 712 can also be used to communicate with network or cloud storage used as a repository for stored images for use with the media editing application 102. Such network or cloud storage can also include updated or archived versions of the media editing application for distribution and installation.

Staying with FIG. 7, in some embodiments, the computing system 700 also includes the presentation device 715 depicted in FIG. 7. A presentation device 715 can include any device or group of devices suitable for providing visual, auditory, or other suitable sensory output. In examples, presentation device 715 displays input and/or extrapolated images. Non-limiting examples of the presentation device 715 include a touchscreen, a monitor, a separate mobile computing device, etc. In some aspects, the presentation device 715 can include a remote client-computing device that communicates with the computing system 700 using one or more data networks. System 700 may be implemented as a unitary computing device, for example, a notebook or mobile computer. Alternatively, as an example, the various devices included in system 700 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

Example code for the algorithms discussed above is shown below.

---

Algorithm 1: Training algorithm for stage-2

---

Input:
Ground Truth Segmentation Map:
$S_{gt} \in \{0, 1\}^{2h \times 2w \times c}$,
Ground Truth Panoptic Map: $P_{gt} \in \mathbb{R}^{2h \times 2w \times 1}$,
Cropped Segmentation Map: $S_{gt}^c \in \{0,1\}^{h \times w \times c}$
1 Generate $S_{gt}^z \in \{0, 1\}^{2h \times 2w \times c}$ by zero-padding $S_{gt}^c$
2 Generate Boundary Map
    B ← Get Boundary($P_{gt}$)
3 for epoch in maxEpochs do
4  |  $S_{pog} \leftarrow G^2(L_1)$
5  |  $D_{multiscale}^2$ distinguishes between $S_{pog}$ and $S_{gt}$
6  |  Minimize the objective function
7  |_ Update the parameters of $G^2$, $D^2$, $D_{multiscale}^2$
8 return $G^2$

---

Algorithm 2: Training algorithm for stage-4

---

Input:
Cropped Image: $X_{gt}^c \in \mathbb{R}^{h \times w \times 3}$,
Ground Truth Image: $X_{gt} \in \mathbb{R}^{2h \times 2w \times 3}$,
Ground Truth Segmentation Map:
$S_{gt} \in \{0,1\}^{2h \times 2w \times c}$,
Ground Truth Panoptic Map: $P_{gt} \in \mathbb{R}^{2h \times 2w \times 1}$
1. $X_{com} \leftarrow S_{gt} \oplus X_{gt}^c \oplus$ GetBoundary($P_{gt}$) $\oplus$ IaCN ($X_{gt}^c, P_{gt}$)
2 for epoch in maxEpochs do
3  |  Y ← $G^4(X_{com}, E^4(X_{gt}^c))$
4  |  $D_{multiscale}^4$ distinguishes between Y and $X_{gt}$
5  |  $D_{Patch}^4$ distinguishes between crop(Y) and
   |  crop($X_{gt}$), taking crops($X_{gt}$) as the ref.
   |  patches
6  |  Minimize the objective function
7  |  Update the parameters of
   |_ $G^4$, $E^4$, $D_{multiscle}^4$, $D_{patch}^4$
8 return $E^4$, $G^4$ Algorithm 3: Testing algorithm Input: Image: $X \in \mathbb{R}^{h \times w \times 3}$
Output: Outpainted Image: $Y \in \mathbb{R}^{2h \times 2w \times 3}$
1  $S^c \leftarrow \text{PSPNet}(X_{gt}^c)$                // Stage-1
2  $S_{pog} \leftarrow G^2(S^c)$                           // Stage-2
3  $P^I \leftarrow \text{PanopticLabelMap}(S_{pog})$       // Stage-3
4  $X_{Com}^I \leftarrow$
   $S_{pog} \oplus X \oplus \text{GetBoundary}(P^I) \oplus \text{IaCN}(X, P^I)$
5  $Y \leftarrow G^4(X_{Com}^I, E^4(X))$                   // Stage-4

What is claimed is:

1. A computer-implemented method comprising:
segmenting, using a segmentation network, an input image to produce an input segmentation map of a plurality of input instances in the input image;
generating, using the input segmentation map and a peripheral object generation network, an extrapolated semantic label map for an extrapolated image corresponding to the input image;
generating, using a generator network, a panoptic label map for the extrapolated image using the extrapolated semantic label map, the panoptic label map derived from a center coordinate and an offset for each of a plurality of output instances in the extrapolated image;
normalizing, using an instance-aware context normalizer, the input image to apply at least one mean characteristic from the input image to an outpainted region of the extrapolated image;
synthesizing the extrapolated image based the extrapolated semantic label map and the panoptic label map, the extrapolated image comprising the outpainted region including the at least one mean characteristic and at least one of the plurality of output instances; and
rendering, using a rendering module, the extrapolated image.

2. The computer-implemented method of claim 1, further comprising:
discriminating, using a patch co-occurrence discriminator, a texture from the input image;
applying the texture to the outpainted region; and
encoding the input image based on an objective function including a divergence loss term to produce an encoded input image;
wherein synthesizing the extrapolated image is based in part on the encoded input image.

3. The computer-implemented method of claim 1, further comprising computing an image loss for the panoptic label map based on a center loss associated with the center coordinate and an offset loss associated with the offset for at least some of the plurality of output instances to identify partial instances among the plurality of output instances.

4. The computer-implemented method of claim 1, further comprising computing a discrepancy between the extrapolated semantic label map and a ground truth instance boundary map to refine the extrapolated semantic label map.

5. The computer-implemented method of claim 4, further comprising:
computing a local focal loss between the extrapolated semantic label map and the ground truth instance boundary map at a plurality of locations; and
refining the extrapolated semantic label map based on the local focal loss.

6. The computer-implemented method of claim 5, wherein refining the extrapolated semantic label map includes summing the local focal loss at the plurality of locations.

7. The computer-implemented method of claim 1, wherein the at least one mean characteristic comprises an average color.

8. A system comprising:
a segmentation network module configured to segment an input image to produce an input segmentation map;
a peripheral object generation (POG) network module connected to the segmentation network module and configured to generate, using the input segmentation map, an extrapolated semantic label map for an extrapolated image corresponding to the input image;
a generator network module connected to the POG network module and configured to generate a panoptic label map for the extrapolated image using the extrapolated semantic label map, the panoptic label map derived from a center coordinate and an offset for each of a plurality of output instances in the extrapolated image;
a normalizer module connected to the generator network module and configured to normalize the input image to apply at least one mean characteristic from the input image to an outpainted region of the extrapolated image;
a conversion network module connected to the normalizer module and the generator network module, the conversion network module configured to synthesize the extrapolated image based the extrapolated semantic label map and the panoptic label map, the extrapolated image comprising the outpainted region including the at least one mean characteristic and at least one of the plurality of output instances; and
an editing interface module configured to render the extrapolated image.

9. The system of claim 8, further comprising a patch co-occurrence discriminator module configured to discriminate a texture from the input image and apply the texture to the outpainted region.

10. The system of claim 8, wherein the generator network module is further configured to compute an image loss for the panoptic label map based on a center loss associated with the center coordinate and an offset loss associated with the offset for at least some of the plurality of output instances to identify partial instances among the plurality of output instances.

11. The system of claim 8, wherein the POG network module is further configured to refine the extrapolated semantic label map based on a discrepancy between the extrapolated semantic label map and a ground truth instance boundary map.

12. The system of claim 11, wherein the POG network module is further configured to refine the extrapolated semantic label map based on a local focal loss between the extrapolated semantic label map and the ground truth instance boundary map.

13. The system of claim 12, wherein the POG network module is further configured to refine the extrapolated semantic label map based on a sum of the local focal loss at a plurality of locations.

14. The system of claim 8, wherein the at least one mean characteristic comprises an average color.

15. A non-transitory computer-readable medium storing program code executable by a processor to perform operations, the operations comprising:
segmenting an input image to produce an input segmentation map of a plurality of input instances in the input image;

generating, using the input segmentation map, an extrapolated semantic label map for an extrapolated image corresponding to the input image;

a step for generating a panoptic label map for the extrapolated image using the extrapolated semantic label map;

a step for normalizing the input image to apply at least one mean characteristic from the input image to an outpainted region of the extrapolated image;

a step for synthesizing the extrapolated image based the extrapolated semantic label map and the panoptic label map, the extrapolated image comprising an outpainted region including the at least one mean characteristic and at least one of a plurality of output instances; and rendering the extrapolated image.

16. The non-transitory computer-readable medium of claim 15, wherein the program code is further executable to perform operations comprising:

discriminating, using a patch co-occurrence discriminator, a texture from the input image;

applying the texture to the outpainted region; and encoding the input image based on an objective function including a divergence loss term to produce an encoded input image;

wherein synthesizing the extrapolated image is based in part on the encoded input image.

17. The non-transitory computer-readable medium of claim 15, wherein the program code is further executable to perform an operation of computing an image loss for the panoptic label map based on a center loss associated with the center coordinate and an offset loss associated with the offset for at least some of the plurality of output instances to identify partial instances among the plurality of output instances.

18. The non-transitory computer-readable medium of claim 15, wherein the program code is further executable to perform an operation of computing a discrepancy between the extrapolated semantic label map and a ground truth instance boundary map to refine the extrapolated semantic label map.

19. The non-transitory computer-readable medium of claim 18, wherein the program code is further executable to perform operations comprising:

computing a local focal loss between the extrapolated semantic label map and the ground truth instance boundary map at a plurality of locations; and refining the extrapolated semantic label map based on the local focal loss.

20. The non-transitory computer-readable medium of claim 19, wherein the operation of refining the extrapolated semantic label map includes an operation of summing the local focal loss at the plurality of locations.

* * * * *